United States Patent [19]

Ernst et al.

[11] Patent Number: 4,601,625

[45] Date of Patent: Jul. 22, 1986

[54] SELF DRILLING THREADED INSERT FOR DRYWALL

[75] Inventors: Richard J. Ernst, Palatine; Francis C. Peterson, St. Charles; Melissa L. Sledz, Streamwood, all of Ill.

[73] Assignee: Illinois Tool Works Inc., Chicago, Ill.

[21] Appl. No.: 609,260

[22] Filed: May 11, 1984

[51] Int. Cl.$^4$ ............................................. F16B 25/00
[52] U.S. Cl. .................................. 411/387; 411/395
[58] Field of Search .................. 411/387, 29, 30, 31, 411/39, 40, 41, 42, 44, 45, 57, 60, 383, 386, 395, 404

[56] References Cited

U.S. PATENT DOCUMENTS

| | | | |
|---|---|---|---|
| 126,366 | 4/1872 | Wills | 411/395 X |
| 1,051,444 | 1/1913 | Pleister | 411/60 |
| 1,248,008 | 11/1917 | Pleister | 411/60 |
| 1,825,419 | 9/1931 | Plym | 411/411 |
| 2,263,424 | 11/1941 | Langer | 411/387 |
| 2,400,684 | 5/1946 | Clark | 411/404 X |
| 2,654,284 | 10/1953 | Schevenell | 411/387 |
| 3,183,531 | 5/1965 | McKewan | 411/411 X |
| 3,318,182 | 5/1967 | Carlson | 411/387 |
| 3,578,762 | 5/1971 | Siebol | 411/387 |
| 4,202,244 | 5/1980 | Gutshall | 411/404 |
| 4,322,194 | 3/1982 | Einhorn | 411/57 X |

FOREIGN PATENT DOCUMENTS

| | | | |
|---|---|---|---|
| 1500653 | 4/1969 | Fed. Rep. of Germany | 411/411 |
| 231155 | 6/1925 | United Kingdom | 411/387 |
| 2063745 | 6/1981 | United Kingdom | 411/411 |

Primary Examiner—Gary L. Smith
Assistant Examiner—Adrian H. Whitcomb, Jr.
Attorney, Agent, or Firm—David I. Roche; Thomas W. Buckman

[57] ABSTRACT

A threaded insert for drywall having an externally threaded portion and an unthreaded drilling portion of generally equal lengths. The insert is adapted to be installed in a single step with the use of a hand powered screwdriver. A low profile flange at the upper end spaced a distance from the threads allows the insert to be installed flush with the surface of the drywall. Two embodiments are disclosed, one of molded zinc and the other of plastic material. Both embodiments include a drilling portion which can be deflected laterally upon the insertion of a screw therethrough, allowing the use of a single moderate length screw for attaching articles of various thicknesses. The insert eliminates the need to pre-drill a hole with a separate tool.

15 Claims, 11 Drawing Figures

U.S. Patent    Jul. 22, 1986    4,601,625
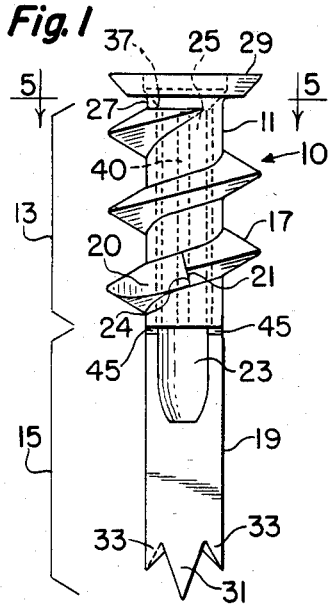
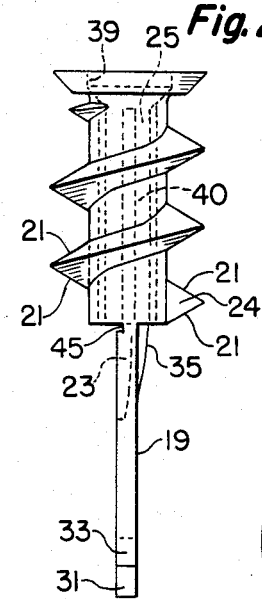
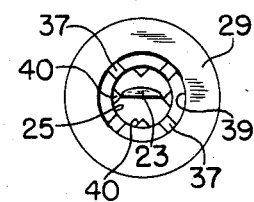
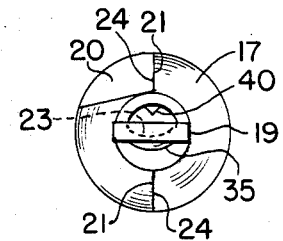
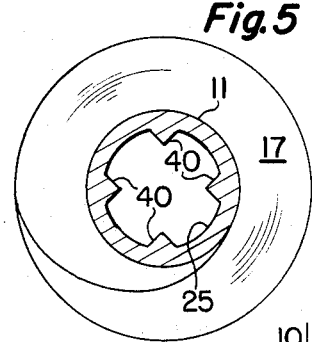
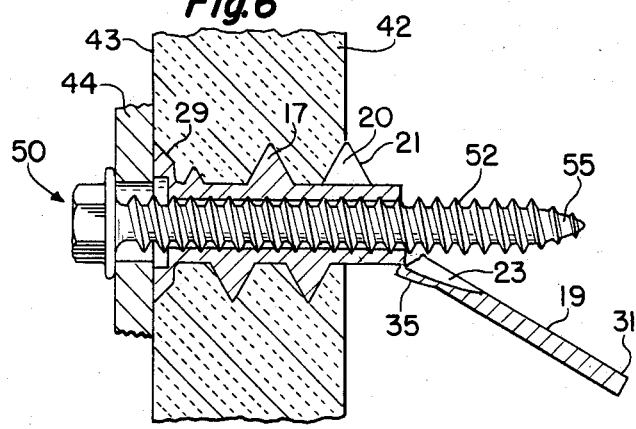
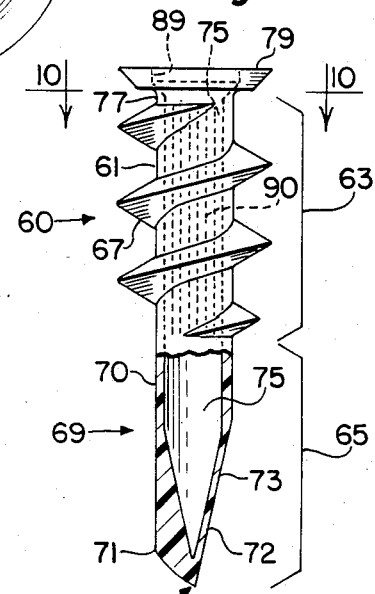
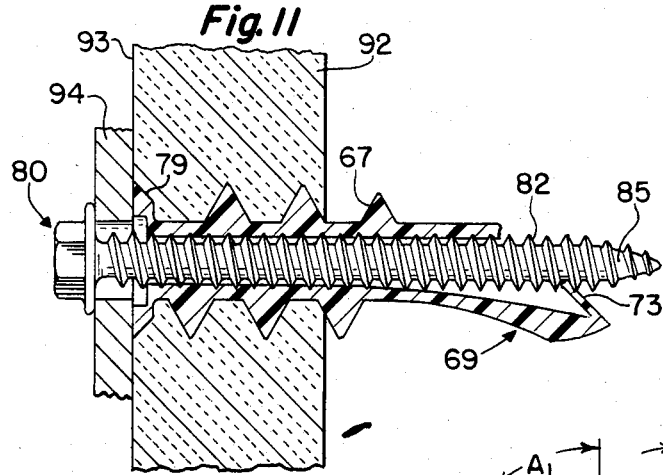
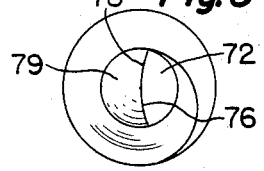
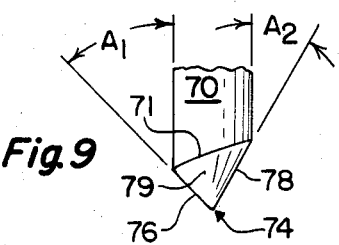
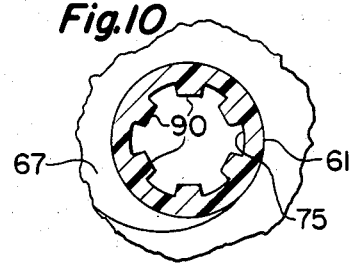

SELF DRILLING THREADED INSERT FOR DRYWALL

BACKGROUND AND SUMMARY OF THE INVENTION

The present invention relates to threaded inserts, and particularly to inserts for use in drywall or sheetrock. Because drywall is a friable gypsum based material, fastening articles thereto can be difficult. Generally, two different methods are used. For light weight articles, plastic expansion anchors are commonly used. Such anchors require three steps to install. First, a hole is drilled into the drywall. Then, the insert is driven into the hole. Finally, a threaded fastener is advanced into the anchor spreading the anchor into engagement with the drywall.

For heavy duty applications, toggle bolts are generally used to attach articles to drywall. While toggle bolts are generally effective, they are also generally expensive because they involve a plurality of parts which must move relative to one another. Another disadvantage of toggle bolts is that they sometimes present difficult installation problems, particularly in the sequence of assembly.

An object of the present invention is to provide an improved method of attaching articles to drywall in which a separate drilling operation is not needed.

Another object of the present invention is to provide an anchor which is simple to install and inexpensive to manufacture.

Another object of the present invention is to provide an anchor for drywall which has improved pull-out resistance compared to light duty plastic anchors, but which is significantly cheaper and easier to install than toggle type anchors.

Another object of the present invention is to provide a threaded insert which has a self drilling feature, and which allows the use of screws of moderate to long length.

These and other objects of the present invention are achieved with a threaded insert which has a cylindrical body with an axial bore, a high thread disposed on the exterior of the body, the threads having notches at the lower end thereof. The insert includes an extended drill tip whose length is substantially equal to the length of the threaded portion of the cylindrical body. The width of the drill tip is substantially equal to the root diameter of the threaded portion. The drill tip is designed to move laterally upon the axial advancement of a threaded fastener through the threaded insert. The interior of the cylindrical body is splined in order to allow a threaded fastener to tap an internal thread therein. Two types of threaded inserts are contemplated in the present invention. A cast zinc version has a flat three-pointed drill tip with a spoon-like indentation therein which communicates with the axial bore. The plastic version of the present invention has a generally conical pointed drill tip with a beveled side which forms a thin frangible wall closing off the axial bore, but which is penetrable by a threaded fastener driven through the threaded insert.

It should be noted that the unthreaded tip in both embodiments has a maximum lateral dimension substantially equal to the root diameter of the threaded portion, and the crest diameter of the threaded portion is substantially twice that of the root diameter. These two features are important in order to achieve a proper threaded connection in the drywall. Because drywall is made of a weak friable material, a high thread is needed to transfer pull-out forces to as much of the material as possible. By making the width drilling portion equal to the root diameter of the threaded portion, the drilling operation removes only as much material as is necessary, leaving behind a maximum amount of workpiece material for thread engagement.

The threaded and drilling portions are generally equal in length to each other, and are generally equal in length to the thickness of standard drywall material. This configuration allows the drilling operation to be completed prior to the start of thread formation in the drywall. Since axial advancement of the insert is significantly slower in the drilling operation than in the thread forming operation, it is necessary that these operations not be performed simultaneously. However, a distinct advantage of the insert of the present invention is that these two operations can be performed in a single step or motion without the need to pre-drill a hole in the drywall with a separate tool.

The objects and advantages of the present invention will become apparent upon a reading of the following specifications, read in conjunction with the accompanying drawings.

BRIEF DESCRIPTION OF THE DRAWINGS

FIG. 1 is a side elevational view of the first embodiment of a self drilling threaded insert constructed in accordance with the present invention;

FIG. 2 is a side elevational view of the insert shown in FIG. 1 taken from the right side of FIG. 1;

FIG. 3 is an end view of the insert of FIG. 1 taken from the top of FIG. 1;

FIG. 4 is an end view of the insert shown in FIG. 1 taken from the bottom of FIG. 1;

FIG. 5 is a sectional view of the insert of FIG. 1 taken along line 5—5 of FIG. 1;

FIG. 6 is a partial sectional view showing the first embodiment of the present invention installed in a workpiece;

FIG. 7 is a side elevational view of a second embodiment of a self drilling threaded insert constructed in accordance with the present invention;

FIG. 8 is an end view of the insert shown in FIG. 7 taken from the bottom of FIG. 7;

FIG. 9 is an elevational view of the tip of the fastener shown in FIG. 7 taken from the left side of FIG. 7;

FIG. 10 is a sectional view taken along line 10—10 of FIG. 7; and

FIG. 11 is a partial sectional view showing the second embodiment of the present invention installed in a workpiece.

DETAILED DESCRIPTION OF THE INVENTION

Referring now to the drawings wherein like parts are designated by the same numerals throughout the various figures, FIGS. 1 and 2 are elevational views of the molded zinc version of the present invention. The insert 10 is comprised of a cylindrical body 11 on which is disposed a high thread 17. A flange 29 is disposed at one end of the body and a flat drilling portion or blade 19 is disposed at the other end thereof. An axial bore 25 extends through the cylindrical body 11 and communicates with a spoon-like opening 23 in the blade 19. The thread 17 is separated from the flange 29 by the space 27. The axial length 13 of the threaded portion of the cylindrical body is generally the same as the axial length 15 of the drilling portion 19. The thread 17 includes notches 20. The notches form a generally radial surface 24 bounded by cutting edges 21. At the juncture of the threaded portion and the drilling portion, weakening slots 45 facilitate the lateral deflection of the blade 19 when a threaded fastener is driven through the threaded insert. The spoon-like opening 23 forms a curved wall 35 which guides the tip of a fastener driven through the insert.

The drilling operation used to install the threaded insert is intended to be achieved with a hand-powered phillips screwdriver. FIG. 3 shows the phillips recess formed in the upper end of the first embodiment. Four slots 37 are formed in the bottom of the recess 39 in the upper end of the insert. The hole forming configuration of the first embodiment is shown in FIGS. 1, 2 and 4. A central spike 31 is formed at the extreme end of the blade 19 and the spike 31 extends beyond the peripheral spikes 33. The spike 31 tends to maintain the location of the insert during drilling, while the spikes 33 tend to neatly cut the paper covering which is used on the surface of drywall. After the paper is cut, the spikes 31 and 33 continue to form a bore in the drywall as the anchor is rotated. After the drilling operation is completed, the thread 17 begins to form a mating thread in the drywall material. The cutting edges 21 assist in the formation of the threads in the drywall.

FIGS. 3 and 5 show the splines 40 on the interior of the bore 25. Depending on the hardness of the material comprising the insert and the crest diameter of an associated threaded fastener, the height and shape of the splines can be varied.

FIG. 6 shows the threaded insert as it appears when fully installed. The threads 17 of the insert are engaging the drywall 42. The upper surface of the flange 29 is flush with the outer surface 43 of the drywall 42. This flush condition is obtained by the use of a low profile head 29 and by the presence of the space 27. The discontinuation of the thread 17 before reaching the head 29 creates a space in the thread form in the drywall material which allows compression of adjacent material by the flange 29, and which, therefore, allows the uppermost surface of the flange 29 to be flush with the outer surface 43 of the drywall.

In FIG. 6 it can also be seen that the insertion of the threaded fastener 50 through the insert causes the blade 19 to deflect laterally. The deflecting feature of the drilling portion is beneficial in that it allows the use of a screw which has a predetermined length regardless of the thickness of the material 44 being fastened.

Another feature of the present invention is that the break-off nature of the blade 19 can be used in an alternative way. Occasionally, drywall is placed over much harder surfaces such as concrete or cement block. In such applications, it is often the case that a small amount of space, generally less than $\frac{3}{4}''$, lies between the back of the drywall and the surface of the supporting structure. When this is encountered, the insert of the present invention can be used in the following manner.

A hand powered screwdriver together with the insert 10 are used to form a hole in the drywall. Once the hole is formed the insert is removed. The blade 19 can then be manually broken off at the location of the weakening slots 45. The insert can then be threaded into the drywall 42, without any danger of the blade 19 contacting the supporting structure.

FIGS. 7 through 11 show a second embodiment of the present invention. The second embodiment is a plastic molded threaded insert 60 comprised of a generally cylindrical body 61 and an external thread 67 disposed thereon. An elongated drilling tip 69 is formed at one end of the body and a low profile flange 79 at the other end. The thread 67 stops before reaching the flange 79 forming an unthreaded neck 77. The length 63 of the threaded portion is generally equal to the length 65 of the drilling tip 69. A bore 75 extends from the flanged end of the insert into the drilling tip 69. As in the first embodiment, the flanged end 79 includes a recess 89 and slots to receive a Phillips driver. The drilling tip 69 is comprised of a conical point 74 and a flat surface 72. The web 73 closes off the bore 75, and prevents dust from entering the bore during the drilling operation.

FIG. 8 shows the drilling end of the insert 60. The conical point 74 is comprised of a generally conical surface 79 and flat surface 72. The cutting edge 76 forms a first angle A1 with the axial portion of the drill tip 69, and the trailing edge 78 forms a second angle A2 with the axial portion of the drill tip 69. Angle A1 is greater than angle A2 in order to ensure that the cutting edge 76 contacts the drywall during the drilling operation. The generally conical surface 79 slopes in the direction of the flanged end from the cutting edge 76 to the trailing edge 78. The sloping surface 79 is not purely conical, but forms a generally helical edge 71 at the intersection of the surface 79 and the axially oriented surface 70.

FIG. 10 is a sectional view showing splines 90 on the interior of the cylindrical body 61. Since the second embodiment is a molded plastic material, the splines 90 may be thicker and more numerous than the splines 40 of the first embodiment, because most plastic materials are softer and more easily tapped than a molded zinc material.

FIG. 11 is a sectional view showing the insert in its installed position in a drywall workpiece 92. As in the first embodiment, the drill tip 69 allows axial penetration of the fastener 80. The threads 82 disposed on the shank 85 engage the splines 90. Because the article 94 is thin, the tip of the fastener 80 penetrates the wall 73 causing lateral deflection of the tip 69. However, a thicker article could be fastened with the same screw, in which case the screw may not penetrate the wall 73. The threads 67 engage the drywall material 92, and the flange 79 is flush with the outer surface 93 of the workpiece 92.

While the invention has been described in terms of two alternative embodiments, it is clear that many modifications, variations and alternatives will be apparent to those skilled in the art. Accordingly it is intended that such modifications, variations and alternatives be within the spirit and scope of the appended claims.

We claim:

1. An anchor for use in friable material comprising a generally hollow cylindrical body with a flanged end and a driling end, said body having an exterior thread disposed thereon, said drilling end including notch means formed in said drilling end adjacent said body for allowing passage of an elongated fastener through and beyond said drilling end, said notch means creating a section of reduced cross-sectional area in said drilling end to reduce resistance of said drilling end to bending.

2. An anchor according to claim 1 wherein said drilling end includes a generally flat pointed extension of said body, said drilling end including means for engaging a fastener and for causing said drilling end to deflect upon advancement of said fastener through said body.

3. An anchor according to claim 1 wherein said flanged end includes a phillips-type drive recess.

4. An anchor according to claim 3 wherein said recess is axially spaced inwardly of said flanged end.

5. An anchor according to claim 1 wherein said body includes a generally cylindrical bore adapted to receive a threaded elongated fastener.

6. An anchor according to claim 5 wherein said bore has a surface interrupted by axially oriented teeth.

7. An anchor according to claim 1 wherein said thread is spaced from said flanged end along said body by an amount less than one pitch of said thread.

8. An anchor according to claim 1 wherein said drilling end has an axial length generally equal to that of said body, whereby drilling of said material is substantially completed prior to engagement of said thread therewith.

9. An anchor according to claim 1 wherein said thread includes at least one interruption having a generally radial flat for performing a thread cutting operation.

10. An anchor for use in friable material comprising a generally hollow cylindrical body having a central bore and an exterior threaded portion having a predetermined axial length, a drill tip at one end of said body and a flange at the other end thereof, said drill tip comprising a generally flat pointed extension of said body, said tip including a spoon-like indentation communicating with said bore, said drill tip having an axial length generally equal to the axial length of the threaded portion of said body.

11. An anchor according to claim 10 wherein said threaded portion of said body has a root and crest diameter such that the crest diameter is generally twice that of the root diameter.

12. An anchor according to claim 10 wherein said tip includes a weakened section near said threaded portion to facilitate passage of an elongated fastener through said anchor.

13. An anchor according to claim 10 wherein said drill tip includes a generally conical point having a flattened side.

14. An anchor according to claim 13 wherein said flattened side forms a frangible wall substantially closing off said bore at said drill tip said wall being penetrable by an elongated fastener.

15. An anchor for use in friable material comprising a generally cylindrical body with a flanged end and a drilling end, said flanged end having torque transmitting surfaces therein, an external thread on a portion of said body, said portion having a crest diameter generally twice its root diameter, and said portion having a predetermined axial length, a drill tip depending from said body having an axial length generally equal to the length of said threaded portion, said tip comprising a generally flat blade having an opening at one end thereof communicating with said bore, said blade having a maximum lateral dimension generally equal to said root diameter, said blade having a free end including three spikes, one of said spikes being centrally located with respect to the axis of said body, the other of said spikes having points spaced at a distance generally equal to said root diameter, the centrally located spike being further from said body than said other spikes, said blade being frangibly connected to said body.

* * * * *